United States Patent
Hasabnis et al.

(10) Patent No.: US 12,032,541 B2
(45) Date of Patent: Jul. 9, 2024

(54) METHODS AND APPARATUS TO IMPROVE DATA QUALITY FOR ARTIFICIAL INTELLIGENCE

(71) Applicant: Intel Corporation, Santa Clara, CA (US)

(72) Inventors: Niranjan Hasabnis, Fremont, CA (US); Justin Gottschlich, Santa Clara, CA (US); Celine Lee, Sunnyvale, CA (US); Emine Tatbul Bitim, Belmont, MA (US); Shengtian Zhou, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 17 days.

(21) Appl. No.: 17/540,050

(22) Filed: Dec. 1, 2021

(65) Prior Publication Data
US 2022/0092042 A1    Mar. 24, 2022

(51) Int. Cl.
G06F 16/215    (2019.01)

(52) U.S. Cl.
CPC ................. *G06F 16/215* (2019.01)

(58) Field of Classification Search
CPC .................................................. G06F 16/215
See application file for complete search history.

(56) References Cited

U.S. PATENT DOCUMENTS

| | | | |
|---|---|---|---|
| 10,025,947 B1 * | 7/2018 | Kaminski | G06F 16/215 |
| 11,704,226 B2 | 7/2023 | Hasabnis et al. | |
| 2020/0162354 A1 * | 5/2020 | Drees | G06N 7/01 |
| 2020/0265301 A1 * | 8/2020 | Burger | G06N 3/084 |
| 2020/0379961 A1 * | 12/2020 | Schuetz | G06F 16/215 |
| 2021/0073632 A1 | 3/2021 | Iyer et al. | |
| 2022/0012163 A1 | 1/2022 | Hasabnis et al. | |
| 2022/0156634 A1 * | 5/2022 | Margolin | G06N 20/00 |
| 2022/0345543 A1 * | 10/2022 | Oleinikov | G06F 16/28 |

OTHER PUBLICATIONS

Ng, "Networking License Plate Readers, Calling out Unreproducible," The Batch, Weekly Issues, Issue 84, DeepLearning.AI, Mar. 24, 14 pages, 2021. [Online]. Available: https://www.deeplearning.ai/the-batch/issue-84/.

(Continued)

*Primary Examiner* — Maher N Algibhah
(74) *Attorney, Agent, or Firm* — Hanley, Flight & Zimmerman, LLC

(57) ABSTRACT

Methods, apparatus, systems, and articles of manufacture to improve data quality for artificial intelligence are disclosed. An example apparatus includes an interface; instructions; and processor circuitry to execute the instruction to: determine an indirect quality of a repository that include datapoints of a dataset; determine a direct quality of the repository that include the datapoints of the dataset; determine a dataset quality based on the indirect quality of the repository and the direct quality of the repository; and when the quality does not satisfy a threshold, filter out a subset of the datapoints to prepare the dataset to support the training of the neural network.

23 Claims, 10 Drawing Sheets

(56) References Cited

OTHER PUBLICATIONS

Gottschlich et al., "The Three Pillars of Machine Programming," in Proceedings of the 2nd ACM SIGPLAN International Workshop on Machine Learning and Programming Languages, Philadelphia, PA, 2018, Intel Labs, MIT, dated Jun. 26, 2021, 11 pages.
IBM, "Project CodeNet," GitHub, released May 5, 2021, 26 pages. [Online]. Available: https://github.com/IBM/Project_CodeNet.
Jefford-Baker et al., "Measuring correlation between commit frequency and popularity on GitHub," KTH Royal Institute of Technology, School of Computer Science and Communication, 2017, 31 pages.
Russell et al., "A large-scale analysis of bioinformatics code on GitHub," PLOS One, vol. 13, No. 10, published Oct. 31, 2018, 19 pages.
Kalliamvakou et al., "The promises and perils of mining GitHub," Proceedings of the 11th Working Conference on Mining Software Repositories, pp. 92-101, May 2014, 15 pages.
Gudivada et al., "Data Quality Considerations for Big Data and Machine Learning: Going Beyond Data Cleaning and Transformations," International Journal on Advances in Software, vol. 10, No. 1 & 2, 2017, 20 pages.
Lease, "On Quality Control and Machine Learning in Crowdsourcing," Conference: Human Computation, Papers from the 2011 AAAI Workshop, San Francisco, California, USA, Aug. 8, 2011, 7 pages.
Washizaki et al., "A Framework for Measuring and Evaluating Program Source Code Quality," in Product-Focused Software Process Improvement, Springer, Berlin, Heidelberg, 2007, 16 pages.
Forouzani et al., "Method for Assessing Software Quality Using Source Code Analysis," ICNCC '16: Proceedings of the Fifth International Conference on Network, Communication and Computing, Kyoto, Japan, Dec. 17-21, 2016, 5 pages.
Kanellopoulos et al., "Code Quality Evaluation Methodology Using The ISO/IEC 9126 Standard," International Journal of Software Engineering & Applications, (IJSEA), vol. 1, No. 3, Jul. 2010, 20 pages.
Spinellis et al., "Evaluating the Quality of Open Source Software," ELSEVIER, ScienceDirect, Electronic Notes Theoretical Computer Science, vol. 233, pp. 5-28, 2009, 24 pages.
Frenay et al., "Classification in the Presence of Label Noise: A Survey," in IEEE Transactions on Neural Networks and Learning Systems, vol. 25, No. 5, May 2014, 25 pages.
Sorzano et al., "A survey of dimensionality reduction techniques.," arXiv: Machine Learning, 2014, 39 pages.
Barnett et al., "Outliers in Statistical Data," 3rd Edition, John Wiley & Sons, reprinted Feb. 1979 and Jun. 1980, pp. 1-51, 31 pages.
Natarajan et al., "Learning with Noisy Labels," Part of Advances in Neural Information Processing Systems 26 (NIPS 2013), 9 pages.
Rolnick et al., "Deep Learning is Robust to Massive Label Noise," in Neural Information Processing Systems, dated Feb. 26, 2018, 10 pages.
Amid et al., "Robust Bi-Tempered Logistic Loss Based on Bergman Divergences," arXiv, 33rd Conference on Neural Information Processing Systems {NeurIPS 2019), Vancouver, Canada, 10 pages.
Hasabnis et al., ControlFlag—a Self-Supervised Defect Detection in Software Control Structures, in The 5th ACM Symposium on Machine Programming, Jun. 21, 2021, dated May 17, 2021, 11 pages.
Luan et al., "Aroma: code recommendation via structural code search," arXiv: Proc. ACM Program. Lang., vol. 3, No. OOPSLA, Article 152. Publication date: Oct. 2019, 28 pages.

\* cited by examiner

US 12,032,541 B2

METHODS AND APPARATUS TO IMPROVE DATA QUALITY FOR ARTIFICIAL INTELLIGENCE

FIELD OF THE DISCLOSURE

This disclosure relates generally to computing systems and, more particularly, to methods and apparatus to improve data quality for artificial intelligence.

BACKGROUND

In recent years, artificial intelligence (AI) have increased in popularity. Artificial intelligence-based models (e.g., machine learning models, deep learning models, neural networks, etc.) are computing systems inspired by the human brain. An AI model can receive an input and generate an output. The AI model may include a plurality of neurons corresponding to weights that can be trained (e.g., can learn, be weighted, etc.) based on feedback so that outputs correspond to desired results. Once the weights are trained, the AI model can make decisions to generate an output based on an input. To train an AI-based model, training data can be used to teach the AI-based model how to generate a desired output based on input data. The more robust the training data, the more robust the AI-based model will be after trained.

DETAILED DESCRIPTION

Figure 1:
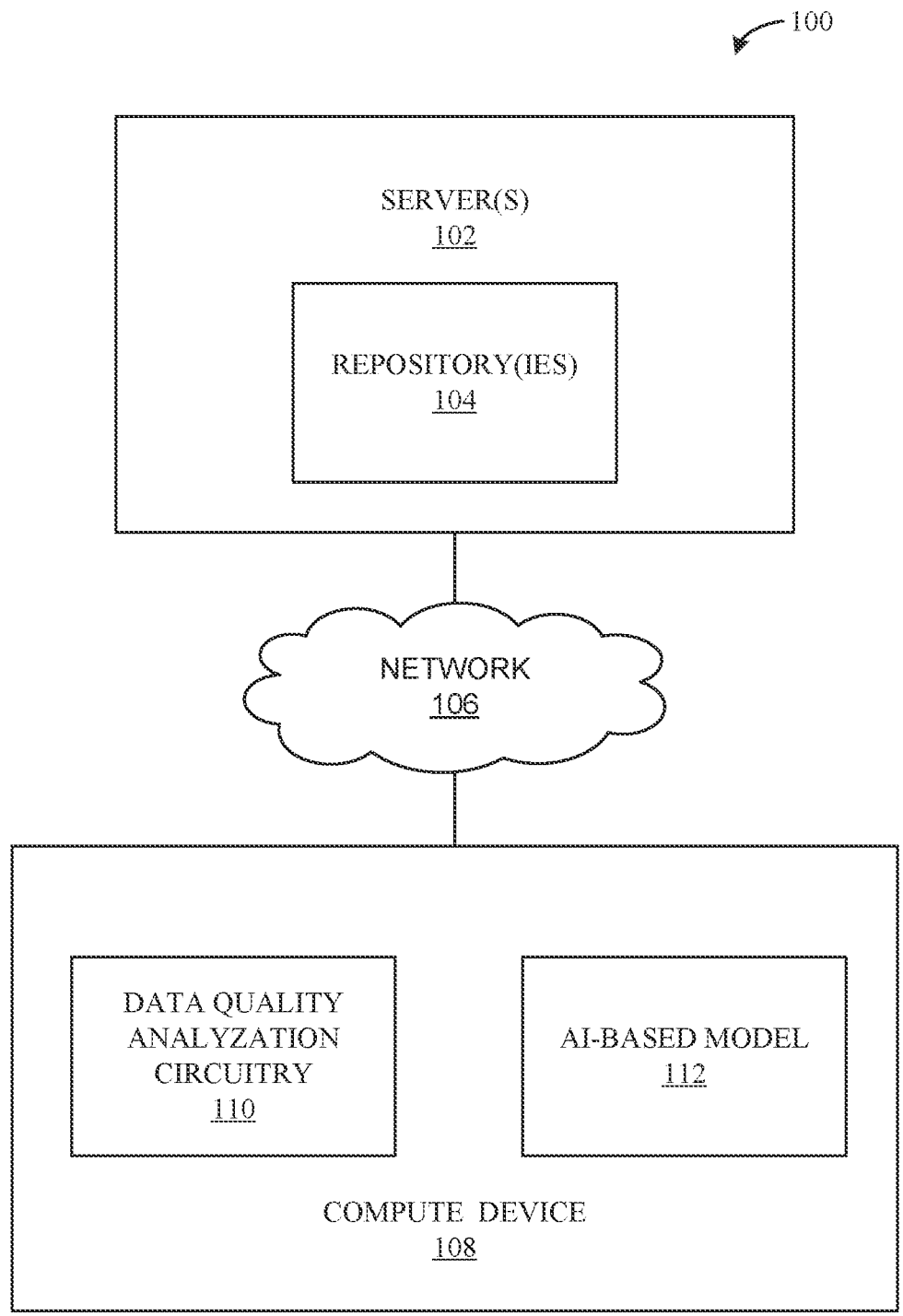
FIG. 1 illustrates an example compute device to determine the quality of data shown in an example environment of use.

The figures are not to scale. Instead, the thickness of the layers or regions may be enlarged in the drawings. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

AI models, such as machine learning models, deep learning models, neural networks, etc. are used to perform a task (e.g., classify data). Implementing AI models may include facilitating a training stage to train the AI-based model using ground truth data (e.g., training data correctly labelled with a particular classification). During training, a portion of the training data may be used to tune the AI-based model to output a desired result based on an input. For example, the AI-based model obtains data that includes inputs and pre-classified outputs and the AI-based model can tune weights based on patterns of the data so that AI-based model will output the desired output based on the input data. Additionally, the AI-based model may use a separate portion of the training data to test the model to identify the accuracy of the AI-based model. If the accuracy is below a threshold, additional training data can be used to further tune the AI-based model.

To generate a robust AI-based model, it may be desirable to use a large amount of training data. However, obtaining and/or creating training data may be difficult. Accordingly, some developers may gather open-source or crowd sourced data as training data. For example, developers may mine source-code data from a source-code repository in order to develop an AI-based model that utilizes source code (e.g., to classify source code, to classify high level code based on source code, to generate high level language based on source code, to generate source code based on high level language, etc.). For example, GitHub is a website that includes multiple repositories of source code that may be used as training data for an AI-based model.

However, open-sourced and/or crowd-sourced data may include low quality and/or malicious data. In some examples, an attacker may generate a repository with low quality and/or malicious information designed to negatively affect the quality of an AI-based model. In some examples, a person may provide poor quality data corresponding to bugs, errors, and/or another poor quality metric of a repository. Using poor quality data may result in a poor quality AI-based model. Accordingly, examples disclosed herein provide a mechanism for determining the quality of data points in a dataset, quality of the datasets, and/or quality of the repositories using a direct and/or indirect approach. An example approach corresponds to a graph analysis technique to directly quantify the quality of the data. A direct quality is a quality corresponding to how each datapoint of a dataset is used across repositories that contribute to the datapoint (e.g., datapoints that are included in the repositories). An indirect quality is a quality determined using repository metadata to determine quality of repositories, datapoints and/or datasets within the repositories. As used herein, a datapoint is one or more pieces of data (e.g., source code, pictures, audio, video, text, etc.) and/or one or more data structures. In some examples disclosed herein, if the quality of the training dataset is below a threshold, low quality data is removed from the training dataset to improve the quality of the training dataset. Accordingly, examples disclosed herein improve training data, which improves the accuracy, and/or robustness of AI-based models that are configured and/or trained based on the improved training data relative to models that are configured and/or trained based on the originally unprocessed training data.

FIG. 1 is a block diagram of an example environment 100 described in conjunction with examples disclosed herein. The example environment 100 includes example server(s) 102, example repository(ies) 104, an example network 106, an example compute device 108, example data quality analyzation circuitry 110, and an example AI-based model 112.

The example server(s) 102 of FIG. 1 may be server(s) and/or any other compute device(s) that store(s) data that can be obtained to train an AI-based model. For example, the server(s) 102 may be a server that includes the example repository(ies) 104. For example, the server(s) 102 may be a GitHub server that includes the example repository(ies) 104 that store source code and corresponding metadata. The metadata may include information corresponding to the repository. For example, when the example repository(ies) 104 is/are source-code repository(ies), the metadata may include age of the repository(ies), total number of contributors, total number of commits, number of lines of code, total number of open issues, total number of closed issues, whether the code includes a unit test, whether the code includes documentation, the number of full continuous integration and delivery (CI/CD) runs style checks, the number of CI/CD run unit test, etc. A continuous integration is a software development technique where members of a team can use a version control system and integrate their work to the same location. A continuous delivery is a software development technique where a release process is automated. In another example, if the repository(ies) 104 corresponds to images, for example, from a database proprietor (e.g., Instagram, Facebook, etc.), the metadata may include number of images, type of images, etc. In some examples, the metadata may correspond to the metadata of the datapoints of the repository including image resolution, image size, number of copies, number of likes, etc. As further described below, the example compute device 108 can access (e.g., via the network 106) the data from the repository(ies) 104 from one or more server(s) 102 to use as training data. In some examples, the server(s) 102 may obtain feedback from the example compute device 108. For example, if the compute device 108 determines that one or more repository(ies) 104, datasets in the repository(ies) 104, and/or datapoints in the dataset are low quality and/or malicious, the compute device 108 may transmit feedback regarding the low quality and/or malicious datapoints, datasets, and/or repository(ies) 104. In this manner, the example server(s) 102 can flag the dataset/datapoints/repository for further review and/or remove the dataset/datapoints/repository.

The example network 106 of FIG. 1 is a system of interconnected systems which may exchange and/or pass data in or more directions. The example network 106 may be implemented using any type of public or private network such as, but not limited to, the Internet, a telephone network, a local area network (LAN), a cable network, and/or a wireless network. To enable communication via the network 106, the example server(s) 102 and/or the compute device 108 includes a communication interface that enables a connection to an Ethernet, a digital subscriber line (DSL), a telephone line, a coaxial cable, or any wireless connection, etc. In some examples, the server(s) 102 and the example compute device 108 are connected via the example network 106.

The example compute device 108 of FIG. 1 obtains data from the repository(ies) 104, evaluates the quality of the obtained data, and uses the data to train the AI-based model 112. The example compute device 108 may be a server, a computer, a mobile device, a tablet, a phone, and/or any other type of compute device. The example compute device 108 includes the data quality analyzation circuitry 110 to determine and/or improve the quality of training data and the AI-based model 112 to be trained using the training data.

The example data quality analyzation circuitry 110 of FIG. 1 accesses a dataset of example data (e.g., datapoint(s)) that are stored in one or more repository(ies) 104 at the server(s) 102. The dataset is to be used as training data for the AI-based model 112. Prior to using the dataset as training data, the example data quality analyzation circuitry 110 determines the quality of the datapoints, the dataset, and/or the repositories 104 that contribute to the datapoints (e.g., the repositories that include the datapoints). As further described below, the example data quality analyzation circuitry 110 determines the quality of a dataset based on the quality of the datapoints, the quality of the datapoints based on the quality of the repositories that contribute to the datapoints, and the quality of the repositories based on a direct quality metric and/or an indirect quality metric. In some examples, the data quality analyzation circuitry 110 may filter out datapoints and/or datasets based on the quality of the datapoints and/or datasets. In some examples, the data quality analyzation circuitry 110 transmits an indication of the determined quality to the example server(s) 102. The example data quality analyzation circuitry 110 transmits the training data (e.g., after filtering, if filtered) to be used to train the example AI-based model 112. An example implementation of the data quality analyzation circuitry 110 is further described below in conjunction with FIG. 2.

In the state shown in FIG. 1, the example AI-based model 112 of FIG. 1 is an untrained model that is trained using the training data from (e.g., identified by, processed by, passed by, obtained from, etc.) the example data quality analyzation circuitry 110. The AI-based model may be a machine learning model, a deep learning model, a random forest, a neural network, and/or any other type of AI-based model. The training data may be used to train and/or test the model 112 to output a desired output based on inputs.

Figure 2:
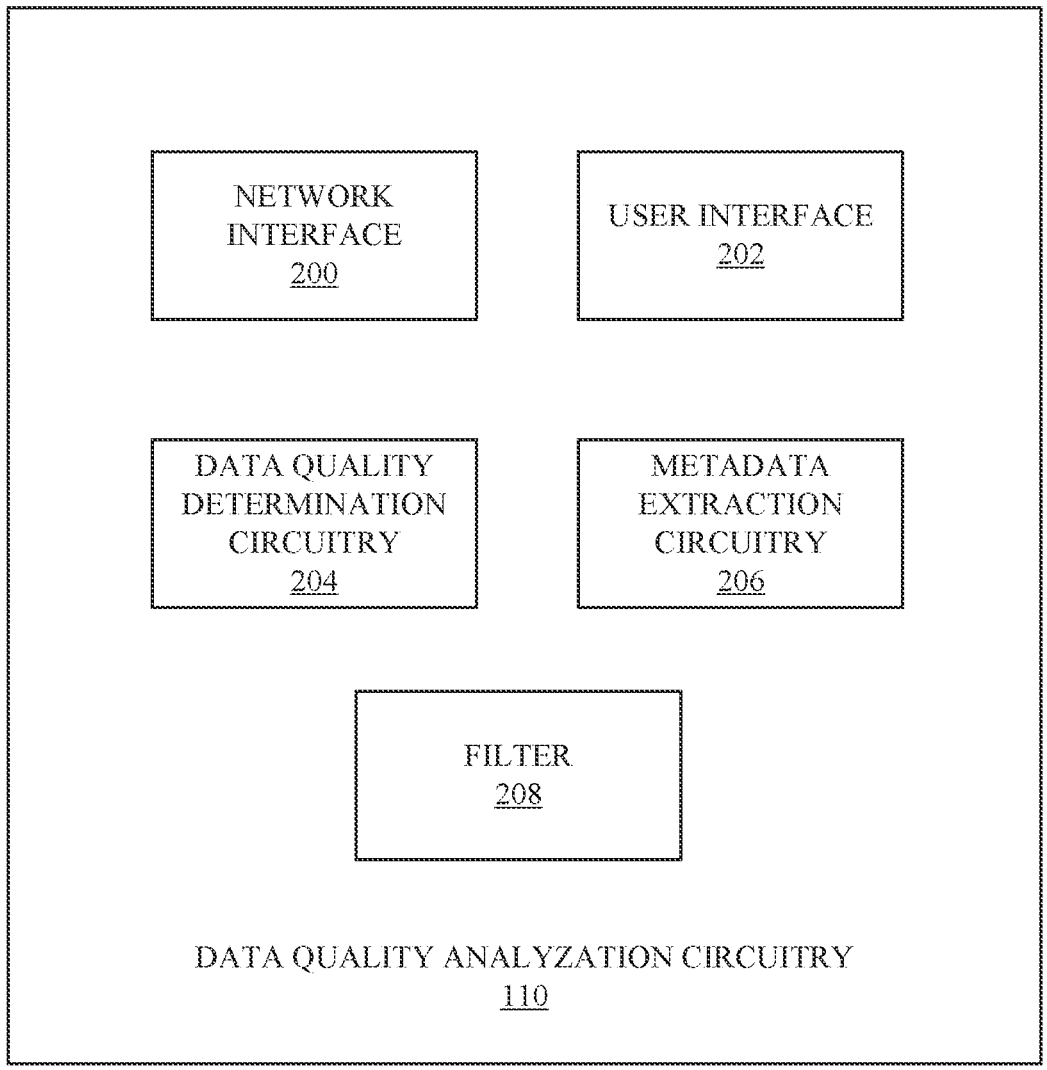
FIG. 2 is a block diagram of an example implementation of the data quality analyzation circuitry of FIG. 1.

FIG. 2 is a block diagram of an example implementation of the data quality analyzation circuitry 110 of FIG. 1. The data quality analyzation circuitry 110 of FIG. 2 may be instantiated (e.g., creating an instance of, bring into being for any length of time, materialize, implement, etc.) by processor circuitry such as a central processing unit executing instructions. Additionally or alternatively, the data quality analyzation circuitry 110 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor. The example data quality analyzation circuitry 110 includes an example network interface 200, an example user interface 202, example data quality determination circuitry 204, example metadata extraction circuitry 206, and an example filter 208.

The example network interface 200 of FIG. 2 access data from the example repository(ies) 104 of the example servers 102 of FIG. 1 via the example network 106. For example, the network interface 200 may pull a dataset and/or datapoints from one or more of the repository(ies) 104. In some examples, when a dataset is obtained, the network interface 200 may transmit a request to the server(s) 102 for information related to the datapoints in the dataset. In response to the request, the network interface 200 may obtain a response from the server(s) 102 that corresponds to the repositories that contribute to the datapoints. The response may include identifiers for the repositories that contribute to the datapoints and the metadata related to the repositories. In some examples, the network interface 200 transmits quality information corresponding to the datapoints and/or repository(ies) that contribute to the datapoints to the example server(s) 102.

The example user interface 202 of FIG. 2 obtains information from a user. For example, a user can select a dataset and/or datapoints to create a dataset using the example interface 202. Additionally or alternatively, a user can select factors for determining the indirect quality of a repository. Selections can be made via a touchscreen, a mouse, a keyboard, and/or any other type(s) of input device.

Figure 4:
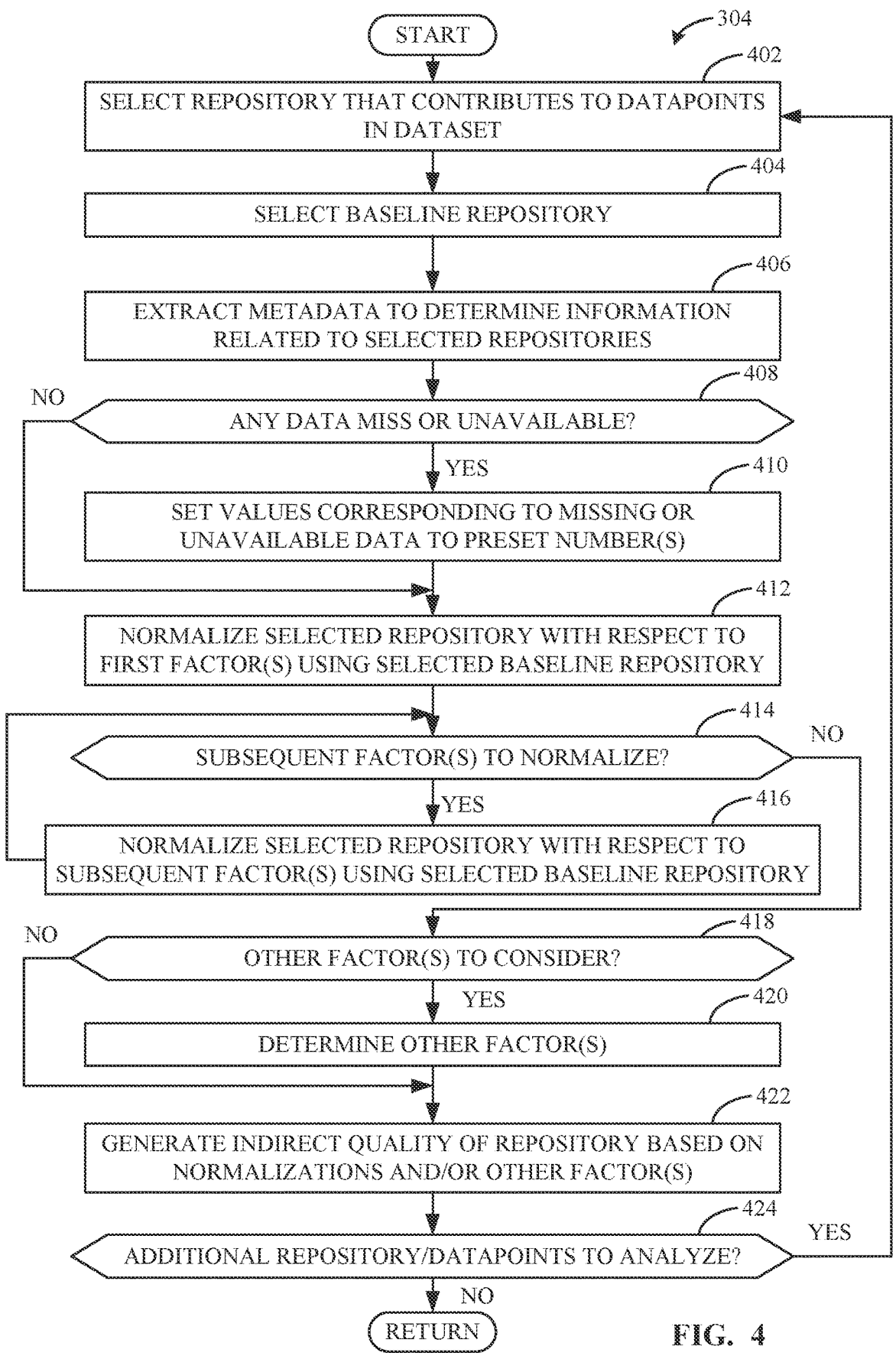

The example data quality determination circuitry 204 of FIG. 4 determines the quality of a dataset based on the quality of the datapoints, the quality of the datapoints based on the quality of the repositories that contribute to the datapoints, and the quality of the repositories based on a direct quality metric and/or an indirect quality metric. For example, the data quality determination circuitry 204 determines the quality of a dataset using the below Equation 1.

$$\text{dataset\_quality}(E, C, R) = \frac{\sum_{k=0}^{n} \text{example\_quality}_{\{E,C,R\}}(e_i)}{n} \quad \text{(Equation 1)}$$

In the above Equation 1, E is the dataset, $e_i$ are the datapoints that make up the dataset, n is the number of datapoints in the dataset, and R is the set of repositories that contribute to the $e_i$ datapoints of the dataset. Equation 1 represents an average quality of the datapoints that are in the dataset (e.g., the quality of a dataset is based on the average quality of the datapoints in the dataset). The data quality determination circuitry 204 determines the quality of the datapoints may be defined by the below Equation 2

$$\text{example\_quality}_{\{E,C,R\}}(e) = \frac{\sum_{k=0}^{k} \text{repo\_quality}_{\{E,C,R\}}(r_i) \mid (r_i \to e) \in C}{k} \quad \text{(Equation 2)}$$

In the above Equation 2, k is the number of repositories that contribute to the datapoint e. Equation 2 represents an average repository quality for the repositories that contribute to the datapoint. The data quality determination circuitry 204 determines the quality of the repositories based on an average of the indirect quality and the direct quality, as shown below in Equation 3. In some examples, instead of an average, a weighted average may be used (e.g., to more strongly weight the indirect quality or the direct quality).

$$\text{repo\_quality}_{\{E,C,R\}}(r) = \frac{\text{indirect\_quality}_b(r) + \text{direct\_quality}_{\{E,C,R\}}(r)}{2} \quad \text{(Equation 3)}$$

To determine the indirect quality of a repository, the example data quality determination circuitry 204 gives a value based on various information corresponding to the repository that may be extracted from metadata. For example, if the repository is a source-code based repository, the information may include whether the example repository(ies) 104 is/are source-code repository(ies), the metadata may include age of the repository(ies), total number of contributors, total number of commits, number of lines of code, total number of open issues, total number of closed issues, whether the code includes unit test, whether the code includes documentation, the number of full continuous integration and delivery (CI/CD) runs style checks, the number of CI/CD run unit test, etc. Such information may be extracted from metadata corresponding to the repository(ies) 104. In some examples, the example data quality determination circuitry 204 determines the indirect quality by combining a normalization of the information corresponding to the repositories with respect to number of comments and number of commits using a baseline repository, a normalization of the information corresponding to the repositories the repositories with respect to the total number of open issues and the total number of closed issues using the baseline repository, and/or other factor(s), as shown below in Equations 4-7. The baseline repository may be a repository that has previously been analyzed. In some examples, the baseline repository is a repository that has been determined to include high quality data.

$$\text{norm\_cb\_cm}_b(r) = \left(\frac{r_{cb}}{b_{cb}} + \frac{r_{cm}}{b_{cm}}\right) \times \frac{r_{ag}}{b_{ag}} \quad \text{(Equation 4)}$$

$$\text{norm\_io\_ic}_b(r) = \left(\frac{r_{io}}{b_{io}} + \frac{r_{ic}}{b_{ic}}\right) \times \frac{r_{loc}}{b_{loc}} \quad \text{(Equation 5)}$$

$$\text{others}(r) = r_{ut} + r_{doc} + r_{csc} + r_{cut} \quad \text{(Equation 6)}$$

$$\text{indirec\_quality}_b(r) = \quad \text{(Equation 7)}$$
$$\text{norm\_cb\_cm}_b(r) + \text{norm\_io\_ic}_b(r) + \text{others}(r)$$

In the above Equations 4-7, r corresponds to the repository, b corresponds to the baseline repository, ag is the repository age in days, cb is the total number of contributors, cm is the total number of commits, loc is the number of lines of code, io is the total number of open issues, ic is the total number of closed issues, ut corresponds to whether the code includes unit tests, doc corresponds to whether the code includes documentation, csc corresponds to the number of CI/CD runs style checks, and cut is the number of CI/CD runs unit test. If any of the above-information is not included, the example data quality determination circuitry 204 may set the variables to one or more present values (e.g., 1 for $b_{cm}$, $b_{cm}$, $b_{ag}$, $b_{io}$, $b_{ic}$, and/or bloc and 0 for $r_{cb}$, $r_{cm}$, $r_{ag}$, $r_{io}$, $r_{ic}$, $r_{loc}$, $r_{ut}$, $r_{doc}$, $r_{csc}$, $r_{cut}$).

To determine the direct quality of a repository, the example data quality determination circuitry 204 determines, for each datapoint in a dataset, the ratio and/or proportion of the number of repositories that contribute the datapoint to the total number of repositories. For example, the data quality determination circuitry can determine the ratio using the below Equation 8.

$$\text{direct\_quality}_{\{E,C,R\}}(r) = \frac{\sum_{k=0}^{k}\left(\text{frac\_repo\_contributions }(e_i) \times \frac{1}{\text{stddev\_repo\_contributions}(e_i)}\right)}{k} \quad \text{(Equation 8)}$$

In the above Equation 8, k is the number of distinct data points to which repository r contributes. The example data quality determination circuitry 204 determines the frac_repo_contributions(e) using the below Equation 9.

$$\text{frac\_repo\_contributuons}_{\{E,C,R\}}(e) = \frac{\text{indegree\_in\_dag}(e)}{m} \quad \text{(Equation 9)}$$

In the above Equation 9, indegree_in_dag(e) is the number of repositories that contribute to the datapoint e and m is the total number of repositories. Based on the above Equation 8, if the frac_repo_contributions(e) is 1.0, datapoint e has been vetted by all repositories, if the value is 0.0, datapoint e has not been vetted by any repository. To consider how much different repositories contribute to a given datapoint (e.g., to avoid giving high value to skewed use of an datapoint when the datapoint is used multiple times in a small number of repositories), the example data quality determination circuitry 204 determines the stddev_repo_contributions(e) using the above Equation 10. The stddev_repo_contributions(e) relates to the balance of the contributions to all datapoints.

$$\text{stddev\_repo\_contributions}_{\{E,C,R\}}(e) = \sigma(l) \mid \left(r \xrightarrow{l} e\right) \in C. \quad \text{(Equation 10)}$$

The example metadata extraction circuitry 206 of FIG. 2 extracts metadata of a repository. As described above, the metadata may include information that may be used to calculate the indirect quality of a repository. Accordingly, the metadata extraction circuitry 206 extracts the metadata to obtain the information used to determine the indirect quality of the repository.

The example filter 208 of FIG. 2 filters out datasets and/or datapoints based on the corresponding quality. If the quality of the datapoints in the dataset used to train the AI-based model 112 are too high or too low, the robustness and/or accuracy of the AI-based model may likewise be low. In some examples, the filter 208 may identify datasets and/or datapoints with quality below a threshold. Because having too many low quality datapoints provides for a less robust and/or inaccurate AI-based model, the example filter 208 may remove repositories and/or datapoints that negatively affect the quality of dataset (e.g., datasets and/or datapoints with quality below a threshold), thereby improving the overall quality of the data. In some examples, the filter 208 may remove datapoints and/or repositories with quality above a threshold. For example, if the quality of the data in the dataset is too high, training the AI-based model 112 may result in poor and/or inaccurate performance when the input data isn't high quality. In such examples, the filter 208 may filter out the repositories and/or datapoints that positively affect the quality of the dataset (e.g., repositories and/or datapoints above a threshold), to balance the quality of the data in the dataset.

While an example manner of implementing the data quality analyzation circuitry 110 of FIG. 1 is illustrated in FIG. 2, one or more of the elements, processes, and/or devices illustrated in FIG. 2 may be combined, divided, re-arranged, omitted, eliminated, and/or implemented in any other way. Further, the example network interface 200, the example user interface 202, the data quality determination circuitry 204, the example metadata extraction circuitry 206, the example filter 208, and/or, more generally, the data quality analyzation circuitry 110 of FIGS. 1-2, may be implemented by hardware, software, firmware, and/or any combination of hardware, software, and/or firmware. Thus, for example, any of the example network interface 200, the example user interface 202, the data quality determination circuitry 204, the example metadata extraction circuitry 206, the example filter 208, and/or, more generally, the data quality analyzation circuitry 110 of FIGS. 1-2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the data quality analyzation circuitry 110 of FIGS. 1-2 is/are hereby expressly defined to include a non-transitory computer readable storage device or storage disk such as a memory, a digital versatile disk (DVD), a compact disk (CD), a Blu-ray disk, etc., including the software and/or firmware. Further still, the data quality analyzation circuitry 110 of FIGS. 1-2 may include one or more elements, processes, and/or devices in addition to, or instead of, those illustrated in FIG. 1-2, and/or may include more than one of any or all of the illustrated elements, processes, and devices.

Flowcharts representative of example hardware logic circuitry, machine readable instructions, hardware implemented state machines, and/or any combination thereof for implementing the data quality analyzation circuitry 110 are shown in FIGS. 3-6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIG. 7. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the compute device 108 and/or the data quality analyzation circuitry 110 of FIGS. 1-2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or compute devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a compute device and/or other machine. For example, the machine readable instructions may be stored in multiple parts, which are individually compressed, encrypted, and/or stored on separate compute devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular compute device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
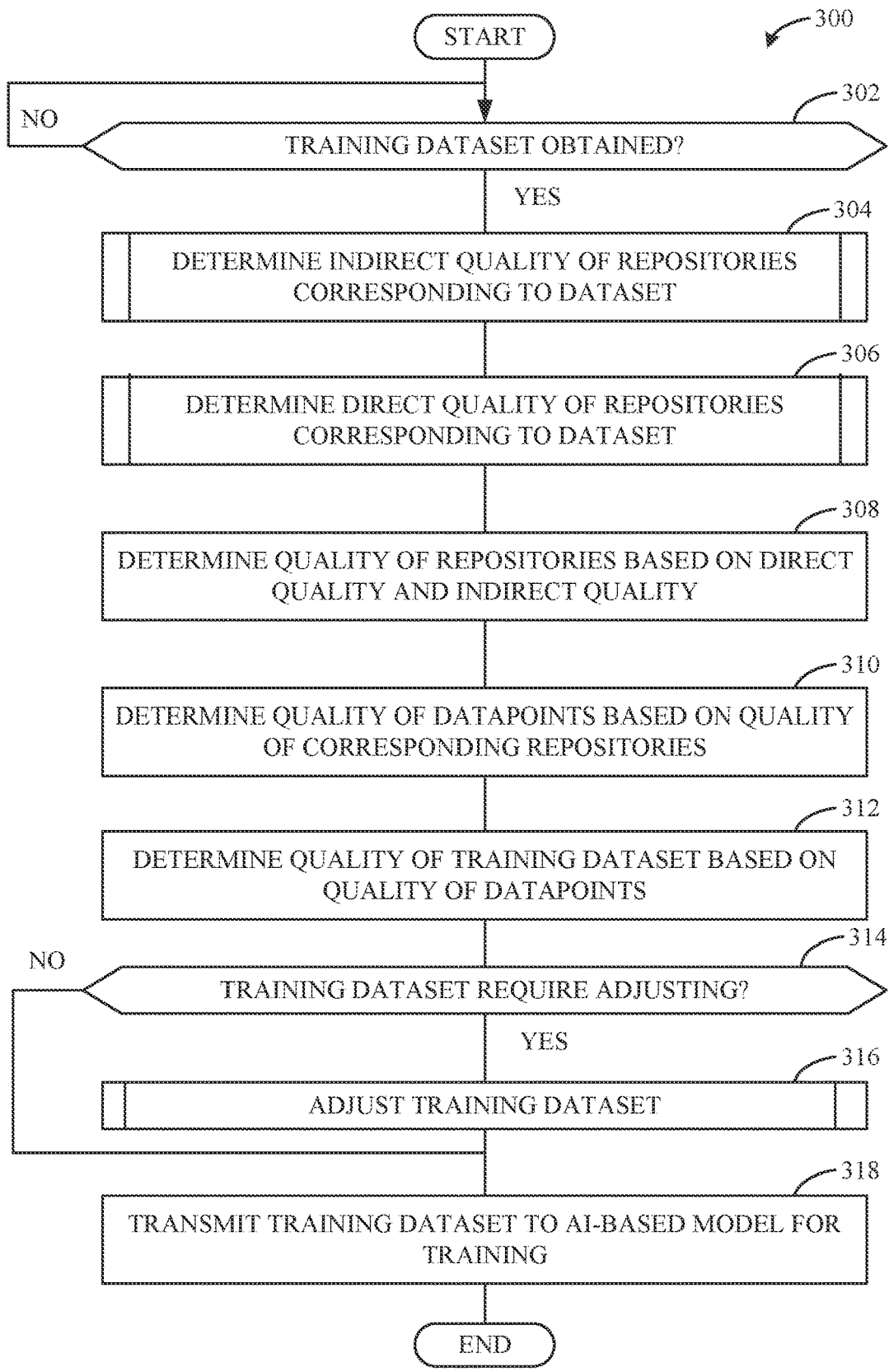
FIGS. 3-6 are flowcharts representative of example machine readable instructions that may be executed by example processor circuitry to implement the data quality analyzation circuitry of FIGS. 1 and/or 2.

FIG. 3 is a flowchart representative of example machine readable instructions and/or example operations 300 that may be executed and/or instantiated by processor circuitry (e.g., the example data quality analyzation circuitry 110 of FIG. 2) to determine quality of training data. The instructions begin at block 302 when the example data quality determination circuitry 204 determines if a training dataset was obtained. The training dataset may be obtained via the network interface 200. In some examples, a user selects the training dataset via the user interface 202 and the network interface 200 accesses the examples of the training dataset from the repository(ies) 104 of the server(s) 102 via the network 106 of FIG. 1.

If the example data quality determination circuitry 204 determines that a training dataset has not been obtained (block 302: NO), control returns to block 302 until a training dataset has been obtained. If the example data quality determination circuitry 204 determines that a training dataset has been obtained (block 302: YES), the example data quality analyzation circuitry 110 determines the indirect quality of the repositories that correspond to the datapoints of the dataset (e.g., the repositories that contribute to datapoints of the dataset) (block 304), as further described below in conjunction with FIG. 4. At block 306, the example data quality analyzation circuitry 110 determines the direct quality of the repositories that correspond to the datapoints of the dataset, as further described below in conjunction with FIG. 5.

At block 308, the example data quality determination circuitry 204 determines the quality of the repositories based on the direct and indirect quality. For example, the data quality determination circuitry 204 may determine the quality of the repository using the above Equation 3. Alternatively, the data quality determination circuitry 204 can obtain a weighted average between the direct and indirect qualities. At block 310, the example data quality determination circuitry 204 determines a quality of datapoints of the dataset based on the quality of the corresponding repositories. For example, the data quality determination circuitry 204 may determine the quality of the datapoints using the above Equation 2.

At block 312, the example data quality determination circuitry 204 determines the quality of the training dataset based on the quality of the datapoints that make up the dataset. For example, the data quality determination circuitry 204 can determine the quality of the dataset using the above Equation 1. At block 314, the example data quality determination circuitry 204 determines whether the training dataset requires adjusting. In some examples, the data quality determination circuitry 204 may determine that the training dataset requires adjusting when the quality is above a first threshold or below a second threshold. In some examples, a user can determine that the training dataset should be adjusted based on data input using the example user interface 202.

If the example data quality determination circuitry 204 determines that the training dataset does not require adjusting (block 314: NO), control continues to block 318. If the example data quality determination circuitry 204 determines that the training dataset requires adjusting (block 314: YES), the example filter 208 adjusts the training dataset (block 316), as further described below in conjunction with FIG. 6. At block 318, the example data quality determination circuitry 204 transmits the training dataset to the AI-based model 112 for training (e.g., via a bus and/or interface).

FIG. 4 is a flowchart representative of example machine readable instructions and/or example operations that may be executed and/or instantiated by processor circuitry (e.g., the data quality analyzation circuitry 110 of FIG. 2) to determine the indirect quality of repositories that contribute to datapoints of the training dataset, in conjunction with block 304 of FIG. 3. The instructions begin at block 402 when the example data quality determination circuitry 204 selects a repository that contributes to an datapoint in the dataset.

At block 404, the example data quality determination circuitry 204 selects a baseline repository. As described above, the baseline repository may be a repository that has been preselected and/or selected by a user (e.g., via the user interface 202) based on the quality of the repository. At block 406, the example metadata extraction circuitry 206 extracts metadata of the repository to determine information related to the selected repository and the selected baseline repository. In some examples, the network interfaces 200 accesses the metadata corresponding to the selected repositories from the server(s) 102 via the network 106. At block 408, the example data quality determination circuitry 204 determines whether any data corresponding to variables used to calculate the indirect quality are missing, unavailable, and/or inaccurate (e.g., if any of the numbers are clearly an error, such as when a number of comments is a negative number).

If the example data quality determination circuitry 204 determines that no data is missing or unavailable (block 408: NO), control continues to block 412. If the example data quality determination circuitry 204 determines that data is missing or unavailable (block 408: YES), the example data quality determination circuitry 204 sets the values corresponding to missing or unavailable data to one or more preset numbers (e.g., 0 and/or 1) (block 410), as further described above in conjunction with FIG. 2. At block 412, the example data quality determination circuitry 204 normalizes the selected repository with respect to first factors using the selected baseline repository. For example, the data quality determination circuitry 204 normalizes the selected repository with respect to the number of contributors and the number of commits using the above Equation 4 when determining the indirect quality of a source code based repository. At block 414, the example data quality determination circuitry 204 determines if there are subsequent factor(s) to normalize based on the technique used to determine the indirect quality. If the example data quality determination circuitry 204 determines that there are no other factor(s) to normalize (block 414: NO), instructions continue to block 418.

If the example data quality determination circuitry 204 determines that there are other factor(s) to normalize (block 414: YES), the example data quality determination circuitry 204 normalizes the selected repository with respect to the second factors using the selected baseline repository (block 416) and control returns to block 414. For example, the example data quality determination circuitry 204 normalizes the selected repository with respect to the number of open and close issues using the above Equation 5 when determining the indirect quality of a source code-based repository. At block 418, the example data quality determination circuitry 204 determines if there are any other factor(s) to consider (e.g., based on the technique used to determine the indirect quality). If the data quality determination circuitry 204 determines that there no other factors to consider (block 418: NO), control continues to block 422. If the example data quality determination circuitry 204 determines that other factor(s) should be considered (block 418: YES), the example data quality determination circuitry 204 determines the other factors (block 420). For example, the data quality determination circuitry 204 determines the other factors using the above-Equation 6 when determining the indirect quality of a source code-based repository.

At block 422, the example data quality determination circuitry 204 generates the indirect quality of the repository based on the normalization(s) and/or the other factor(s). For example, the data quality determination circuitry 204 may determine the indirect quality of the repository using the above-Equation 7. At block 424, the example data quality determination circuitry 204 determines if there are additional repositories that contribute to the datapoint and/or or additional datapoints from the dataset to analyze. If the example data quality determination circuitry 204 determines that there are additional repositories and/or datapoint to analyze (block 424: YES), control returns to block 402. If the example data quality determination circuitry 204 determines that there no other repositories and/or datapoint to analyze (block 424: NO), control returns to block 306 of FIG. 3.

Figure 5:
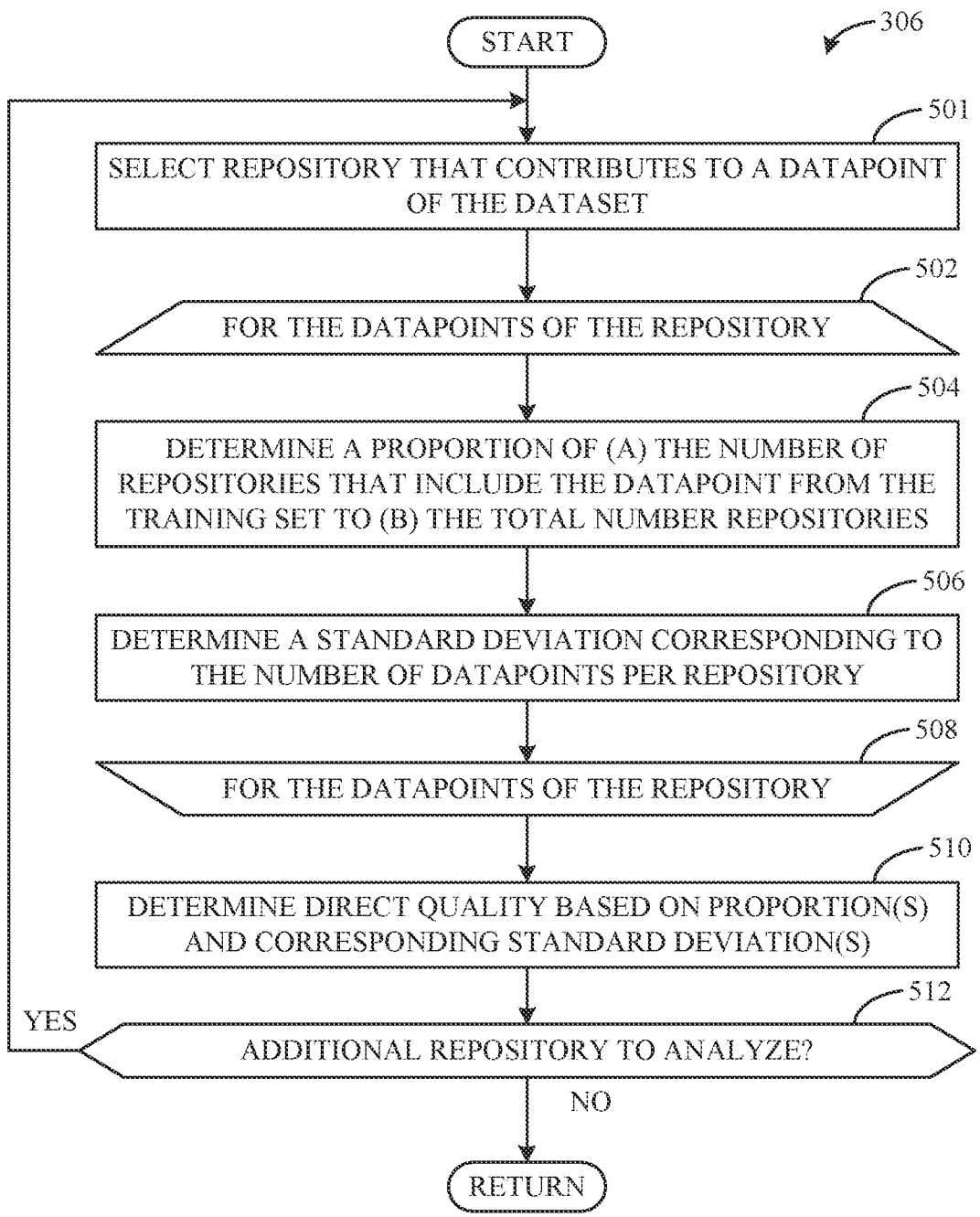
Figure 6:
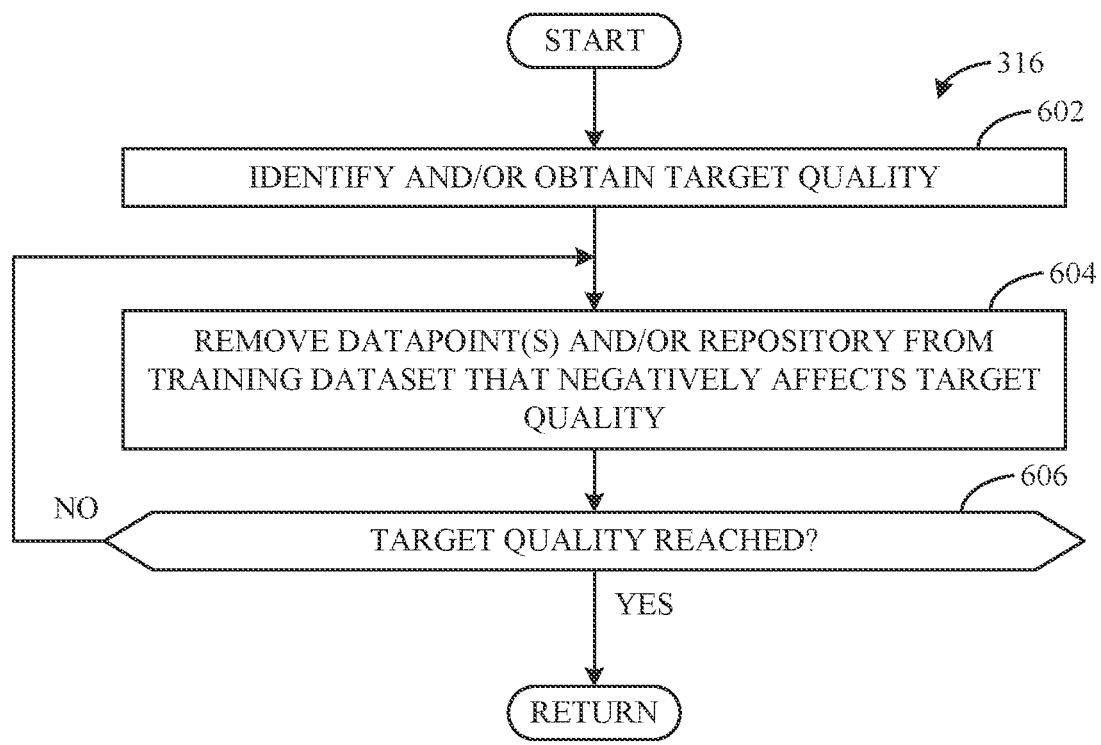

FIG. 5 is a flowchart representative of example machine readable instructions and/or example operations that may be executed and/or instantiated by processor circuitry (e.g., the data quality analyzation circuitry 110 of FIG. 2) to determine the direct quality of repositories that contribute to datapoints of the training dataset, in conjunction with block 306 of FIG. 3. The example instructions begin at block 501, when the example data quality determination circuitry 204 selects a first repository that contributes to an datapoint in the training dataset.

For each of the datapoints in the training set (blocks 502-508), the example data quality determination circuitry 204 determines a proportion (e.g., a ratio) of (a) the number of repositories that includes the datapoint from the training dataset to (b) the total number of repositories (block 504). For example, the data quality determination circuitry 204 determines the proportion using the above-Equation 9. At block 506, the example data quality determination circuitry 204 determines a standard deviation corresponding to the number of datapoints included in the corresponding repositories. For example, the data quality determination circuitry 204 can determine the standard deviation using the above-Equation 10. At block 510, the example data quality determination circuitry 204 determines the direct quality for the repository based on the proportion(s) and corresponding standard deviation(s). At block 512, the example data quality determination circuitry 204 determines if there is an additional repository to analyze (e.g., an additional repository that contributes to a datapoint of the training dataset). If the example data quality determination circuitry 204 determines that there is an additional repository to analyze (block 5112: YES), control returns to block 501 to process the additional repository. If the example data quality determination circuitry 204 determines that there is not an additional repository to analyze (block 5112: NO), control returns to block 308 of FIG. 3.

FIG. 5 is a flowchart representative of example machine readable instructions and/or example operations that may be executed and/or instantiated by processor circuitry (e.g., the data quality analyzation circuitry 110 of FIG. 2) to adjust the training dataset, in conjunction with block 316 of FIG. 3. The example instructions begin at block 602, when the example filter 208 identifies and/or obtains (e.g., from a user via the user interface 202) a target quality. The target quality may be a quality threshold (e.g., a first quality threshold corresponding to a minimum quality threshold or a maximum quality threshold). In this manner, if the quality of the training dataset does not satisfy the quality threshold (e.g., if the quality of the dataset is above the maximum threshold or below the minimum threshold), the filter 208 can filter out additional repositories and/or datapoints until the quality satisfies the threshold.

At block 604, the example filter 208 removes one or more datapoints and/or repositories from the training dataset that negatively affects the target quality. For example, the filter 208 may select one or more datapoints and/or repositories that do not satisfy a quality threshold (e.g., a second quality threshold that may or may not be the same as the first quality threshold) and remove the one or more datapoints and/or repositories (e.g., from the data quality set if a datapoint or remove all datapoints from a repository if a repository). At block 606, the example data quality determination circuitry 204 can reevaluate the quality of the filtered dataset (e.g., the dataset after filtering out datapoints and/or repositories) and determine whether the target quality has been reached. If the example data quality determination circuitry 204 determines that the target quality has not been reached (block 606: NO), control returns to block 604 to continue to filter out data. If the example data quality determination circuitry 204 determines that the target quality has been reached (block 606: YES), control returns to block 318 of FIG. 3.

Figure 7:
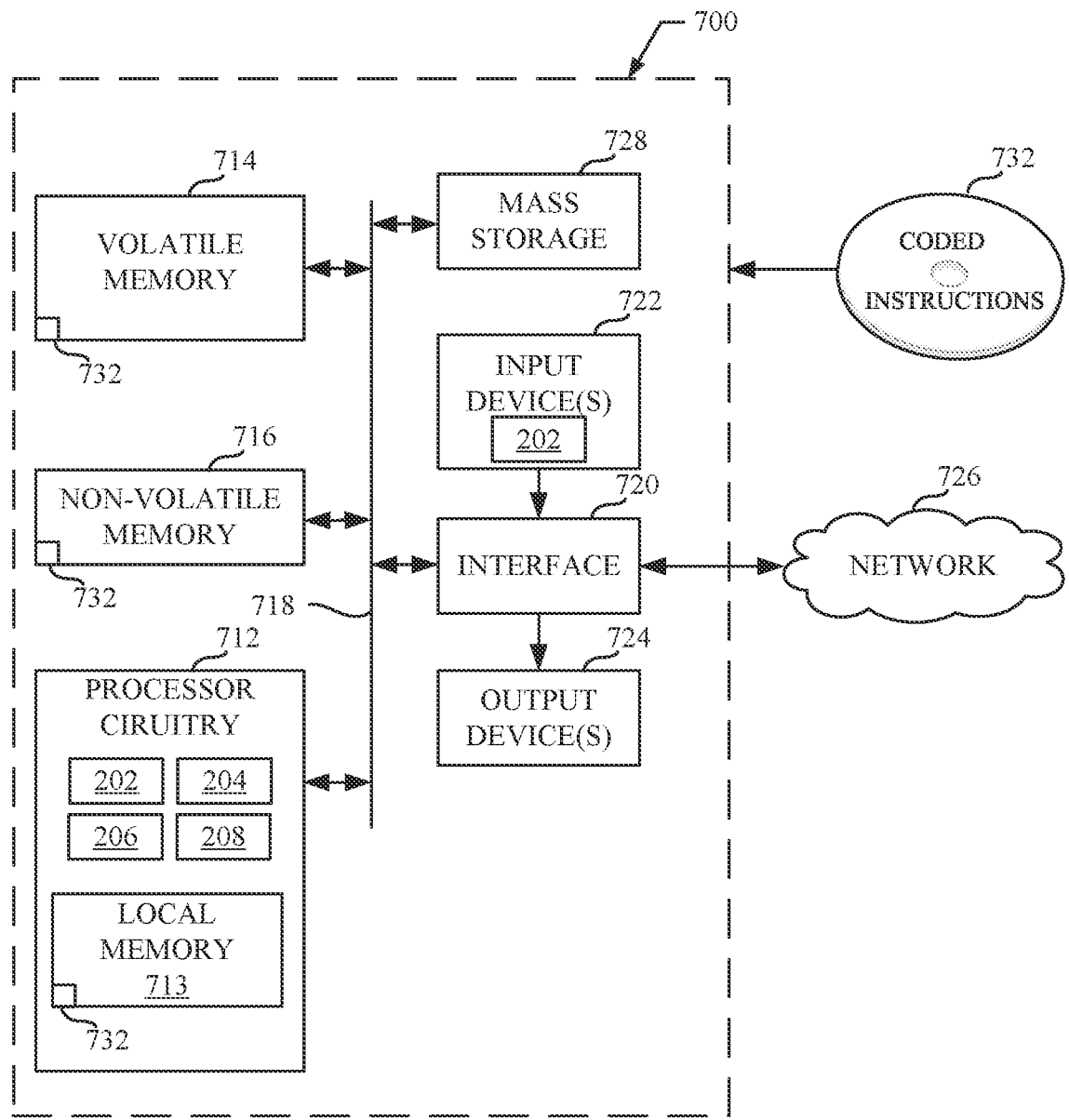
FIG. 7 is a block diagram of an example processor platform including processor circuitry structured to execute the example machine readable instructions of FIGS. 3-6 to implement the example compute device of FIG. 1.

FIG. 7 is a block diagram of an example processor platform 700 structured to execute and/or instantiate the machine readable instructions and/or operations of FIGS. 3-6 to implement the data quality analyzation circuitry 110 of FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example user interface 202, the example data quality determination circuitry 204, the example metadata extraction circuitry 206, and/or the example filter 208 of FIG. 2.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In FIG. 2, the example interface 720 implements the example network interface 200 of FIG. 2.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output devices 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 732, which may be implemented by the machine readable instructions of FIGS. 3-6, may be stored in the mass storage device 728, in the volatile memory 714, in the non-volatile memory 716, and/or on a removable non-transitory computer readable storage medium such as a CD or DVD.

Figure 8:
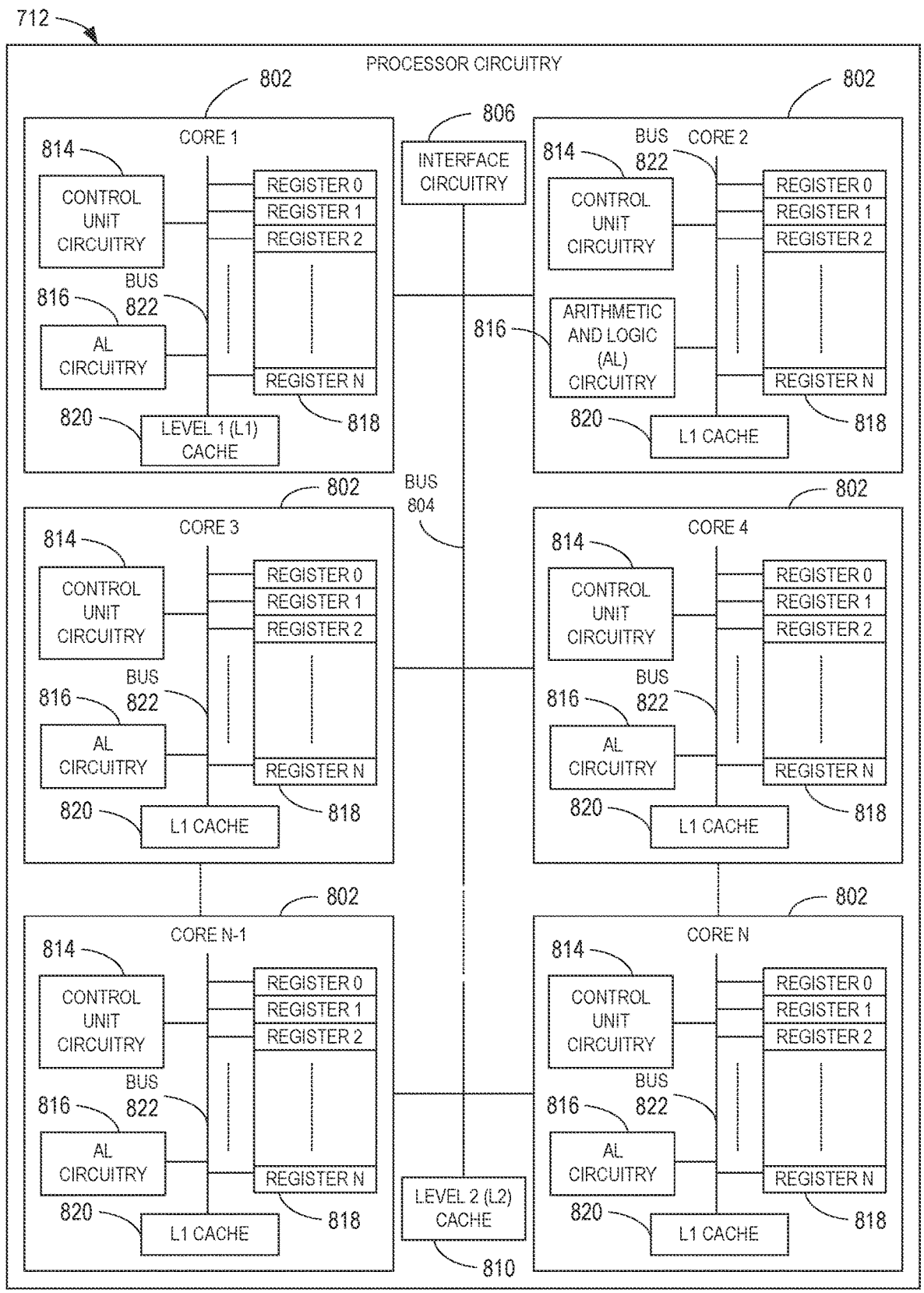
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 712. For example, the microprocessor _00 may implement multi-core hardware circuitry such as a CPU, a DSP, a GPU, an XPU, etc. Although it may include any number of example cores 802 (e.g., 1 core), the microprocessor 712 of this example is a multi-core semiconductor device including N cores. The cores 802 of the microprocessor 712 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIGS. 4 and/or 5

The cores 802 may communicate by an example bus 804. In some examples, the bus 804 may implement a communication bus to effectuate communication associated with one(s) of the cores 802. For example, the bus 804 may implement at least one of an Inter-Integrated Circuit (I2C) bus, a Serial Peripheral Interface (SPI) bus, a PCI bus, or a PCIe bus. Additionally or alternatively, the bus 804 may implement any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 712 also includes example shared memory 810 that may be shared by the cores (e.g., Level 2 (L2_cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic, and logic (AL) circuitry (sometimes referred to as an ALU) 816, a plurality of registers 818, the L1 cache 820, and an example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The bus 820 may implement at least one of an I2C bus, a SPI bus, a PCI bus, or a PCIe bus Each core 802 and/or, more generally, the microprocessor 712 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 712 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
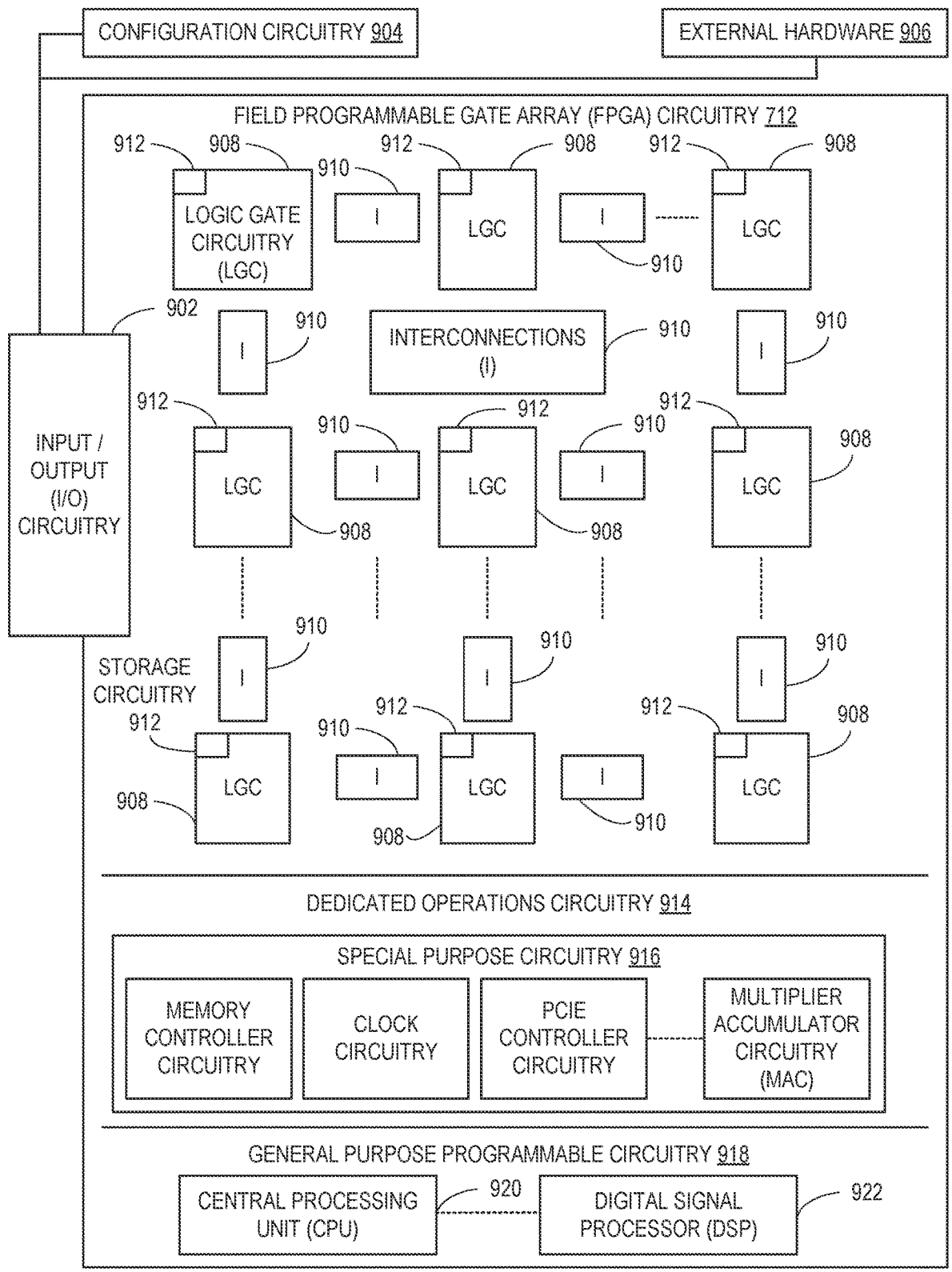
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 712. The FPGA circuitry 712 can be used, for example, to perform operations that could otherwise be performed by the example microprocessor 712 of FIG. 8 executing corresponding machine readable instructions. However, once configured, the FPGA circuitry 712 instantiates the machine readable instructions in hardware and, thus, can often execute the operations faster than they could be performed by a general purpose microprocessor executing the corresponding software.

More specifically, in contrast to the microprocessor 712 of FIG. 8 described above (which is a general purpose device that may be programmed to execute some or all of the machine readable instructions represented by the flowchart of FIG. 4-5 but whose interconnections and logic circuitry are fixed once fabricated), the FPGA circuitry 712 of the example of FIG. 9 includes interconnections and logic circuitry that may be configured and/or interconnected in different ways after fabrication to instantiate, for example, some or all of the machine readable instructions represented by the flowchart of FIG. 4-5. In particular, the FPGA 712 may be thought of as an array of logic gates, interconnections, and switches. The switches can be programmed to change how the logic gates are interconnected by the interconnections, effectively forming one or more dedicated logic circuits (unless and until the FPGA circuitry 712 is reprogrammed). The configured logic circuits enable the logic gates to cooperate in different ways to perform different operations on data received by input circuitry. Those operations may correspond to some or all of the software represented by the flowchart of FIG. 4-5. As such, the FPGA circuitry 712 may be structured to effectively instantiate some or all of the machine readable instructions of the flowchart of FIG. 4-5 as dedicated logic circuits to perform the operations corresponding to those software instructions in a dedicated manner analogous to an ASIC. Therefore, the FPGA circuitry 712 may perform the operations corresponding to the some or all of the machine readable instructions of FIG. 9 faster than the general purpose microprocessor can execute the same.

In the example of FIG. 9, the FPGA circuitry 712 is structured to be programmed (and/or reprogrammed one or more times) by an end user by a hardware description language (HDL) such as Verilog. The FPGA circuitry 712 of FIG. 9, includes example input/output (I/O) circuitry 902 to obtain and/or output data to/from example configuration circuitry 904 and/or external hardware (e.g., external hardware circuitry) 906. For example, the configuration circuitry 904 may implement interface circuitry that may obtain machine readable instructions to configure the FPGA circuitry 712, or portion(s) thereof. In some such examples, the configuration circuitry 904 may obtain the machine readable instructions from a user, a machine (e.g., hardware circuitry (e.g., programmed, or dedicated circuitry) that may implement an Artificial Intelligence/Machine Learning (AI/ML) model to generate the instructions), etc. In some examples, the external hardware 906 may implement the microprocessor 712 of FIG. 8. The FPGA circuitry 712 also includes an array of example logic gate circuitry 908, a plurality of example configurable interconnections 910, and example storage circuitry 912. The logic gate circuitry 908 and interconnections 910 are configurable to instantiate one or more operations that may correspond to at least some of the machine readable instructions of FIG. 4-5 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 712 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 712 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an onboard CPU, such as one or more of the example CPU 920 of FIG. 9. Therefore, the processor circuitry 712 of FIG. 7 may additionally be implemented by combining the example microprocessor 712 of FIG. 8 and the example FPGA circuitry 712 of FIG. 9. In some such hybrid examples, a first portion of the machine readable instructions represented by the flowchart of FIG. 4-5 may be executed by one or more of the cores 802 of FIG. 8 and a second portion of the machine readable instructions represented by the flowchart of FIG. 4-5 may be executed by the FPGA circuitry 712 of FIG. 9.

In some examples, the processor circuitry 712 of FIG. 7 may be in one or more packages. For example, the processor circuitry 712 of FIG. 8 and/or the FPGA circuitry 712 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
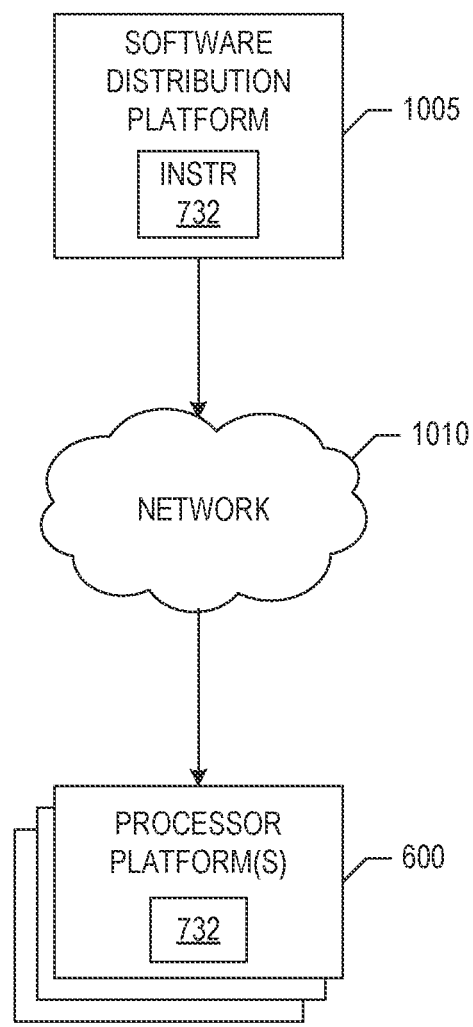
FIG. 10 is a block diagram of an example software distribution platform (e.g., one or more servers) to distribute software (e.g., software corresponding to the example machine readable instructions of FIGS. 3-6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 1005 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 400, 500 of FIGS. 3-6, as described above. The one or more servers of the example software distribution platform 1005 are in communication with a network 1010, which may correspond to any one or more of the Internet and/or any example network. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 400, 500 of FIG. 4-5, may be downloaded to the example processor platform 700, which is to execute the machine readable instructions 732 to implement the data quality analyzation circuitry 110. In some example, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

Example methods, apparatus, systems, and articles of manufacture to improve data quality for artificial intelligence are disclosed herein. Further examples and combinations thereof include the following: Example 1 includes an apparatus to support training a neural network, the apparatus comprising an interface, instructions, and processor circuitry to execute the instruction to determine an indirect quality of a repository that include datapoints of a dataset, determine a direct quality of the repository that include the datapoints of the dataset, determine a dataset quality based on the indirect quality of the repository and the direct quality of the repository, and when the quality does not satisfy a threshold, filter out a subset of the datapoints to prepare the dataset to support the training of the neural network.

Example 2 includes the apparatus of example 1, wherein the processor circuitry is to determine the indirect quality based on at least one of metadata corresponding to the repository, and determine the direct quality based on a proportion of (a) a number of repositories that include a datapoint of the dataset to (b) a total number of the repositories.

Example 3 includes the apparatus of example 2, wherein the metadata includes at least one of ages of the repository, a total number of contributors to the repository, a total number of commits, a number of lines of code in the repository, a total number of open issues, a total number of closed issues, presence of a unit test in the code, presence of documentation in the code, a number of full continuous integration and delivery (CI/CD) runs style checks, or a number of CI/CD run unit test.

Example 4 includes the apparatus of example 1, wherein the processor circuitry is to determine qualities of the datapoints based on an average repository quality of repositories that include the datapoints, the average repository quality being based on the indirect quality and the direct quality.

Example 5 includes the apparatus of example 1, wherein the processor circuitry is to determine the dataset quality based on an average datapoint quality of the datapoints included in the dataset.

Example 6 includes the apparatus of example 1, wherein the subset of the datapoints negatively affects the dataset quality.

Example 7 includes the apparatus of example 1, wherein the subset of the datapoints positively affects the dataset quality.

Example 8 includes the apparatus of example 1, wherein the quality is a first quality and the subset is a first subset, the processor circuitry is to determine a second quality of the dataset after the subset has been filtered out, and in response to the second quality not satisfying the threshold, filter out a second subset of the datapoints to adjust the second quality.

Example 9 includes the apparatus of example 1, wherein the processor circuitry is to employ the dataset after the subset has been filtered out to an artificial intelligence-based model to train the artificial intelligence-based model.

Example 10 includes a non-transitory computer readable medium comprising instructions which, when executed, cause one or more processors to at least determine an indirect quality of a repository that include datapoints of a dataset, determine a direct quality of the repository that include the datapoints of the dataset, determine a dataset quality based on the indirect quality of the repository and the direct quality of the repository, and when the quality does not satisfy a threshold, remove a subset of the datapoints to prepare the dataset to support the training of a neural network.

Example 11 includes the computer readable medium of example 10, wherein the one or more processors is to determine the indirect quality based on at least one of metadata corresponding to the repository, and determine the direct quality based on a proportion of (a) a number of repositories that include a datapoint of the dataset to (b) a total number of the repositories.

Example 12 includes the computer readable medium of example 11, wherein the metadata includes at least one of ages of the repository, a total number of contributors to the repository, a total number of commits, a number of lines of code in the repository, a total number of open issues, a total number of closed issues, presence of a unit test in the code, presence of documentation in the code, a number of full continuous integration and delivery (CI/CD) runs style checks, or a number of CI/CD run unit test.

Example 13 includes the computer readable medium of example 10, wherein the one or more processors is to determine qualities of the datapoints based on an average repository quality of repositories that include the datapoints, the average repository quality being based on the indirect quality and the direct quality.

Example 14 includes the computer readable medium of example 10, wherein the one or more processors is to determine the dataset quality based on an average datapoint quality of the datapoints included in the dataset.

Example 15 includes the computer readable medium of example 10, wherein the subset of the datapoints negatively affects the dataset quality.

Example 16 includes the computer readable medium of example 10, wherein the subset of the datapoints positively affects the dataset quality.

Example 17 includes the computer readable medium of example 10, wherein the quality is a first quality and the subset is a first subset, the one or more processors is to determine a second quality of the dataset after the subset has been removed, and in response to the second quality not satisfying the threshold, remove a second subset of the datapoints to adjust the second quality.

Example 18 includes the computer readable medium of example 10, wherein the one or more processors is to employ the dataset after the subset has been removed to an artificial intelligence-based model to train the artificial intelligence-based model.

Example 19 includes an apparatus to improve a dataset to train a neural network, the apparatus comprising interface circuitry, and processor circuitry including one or more of at least one of a central processing unit, a graphic processing unit or a digital signal processor, the at least one of the central processing unit, the graphic processing unit or the digital signal processor having control circuitry, one or more registers, and arithmetic and logic circuitry to perform one or more first operations corresponding to instructions in the apparatus, and, a Field Programmable Gate Array (FPGA), the FPGA including logic gate circuitry, a plurality of configurable interconnections, and storage circuitry, the logic gate circuitry and interconnections to perform one or more second operations, or Application Specific Integrate Circuitry (ASIC) including logic gate circuitry to perform one or more third operations, the processor circuitry to perform at least one of the first operations, the second operations or the third operations to instantiate data quality determination circuitry to determine an indirect quality of a repository including datapoints of a dataset, determine a direct quality of the repository, and determine a quality of the dataset based on the indirect quality of the repository and the direct quality of the repository, and a filter to filter out a subset of the datapoints to adjust the quality.

Example 20 includes the apparatus of example 19, wherein the data quality determination circuitry is to determine the indirect quality based on at least one of metadata corresponding to the repository, and determine the direct quality based on a proportion of (a) a number of repositories that include a datapoint of the dataset to (b) a total number of the repositories.

Example 21 includes the apparatus of example 20, wherein the metadata includes at least one of ages of the repository, a total number of contributors to the repository, a total number of commits, a number of lines of code in the repository, a total number of open issues, a total number of closed issues, presence of a unit test in the code, presence of documentation in the code, a number of full continuous integration and delivery (CI/CD) runs style checks, or a number of CI/CD run unit test.

Example 22 includes the apparatus of example 19, wherein the data quality determination circuitry is to determine qualities of the datapoints based on an average repository quality of repositories that include the datapoints, the average repository quality being based on the indirect quality and the direct quality.

Example 23 includes the apparatus of example 19, wherein the data quality determination circuitry is to determine the dataset quality based on an average datapoint quality of the datapoints included in the dataset.

Example 24 includes the apparatus of example 19, wherein the subset of the datapoints negatively affects the dataset quality.

Example 25 includes the apparatus of example 19, wherein the subset of the datapoints positively affects the dataset quality.

Example 26 includes the apparatus of example 19, wherein the quality is a first quality and the subset is a first subset, wherein the data quality determination circuitry is to determine a second quality of the dataset after the subset has been filtered out, and the filter is to, in response to the second quality not satisfying a threshold, filter out a second subset of the datapoints to adjust the second quality.

Example 27 includes the apparatus of example 19, wherein the data quality determination circuitry is to employ the dataset after the subset has been filtered out to an artificial intelligence-based model to train the artificial intelligence-based model.

Example 28 includes an apparatus to improve data quality, the apparatus comprising means for determining quality, the means for determining quality to determine indirect qualities of repositories that contribute to datapoints of a dataset, determine direct qualities of the repositories that contribute to the datapoints of the dataset, and determine a dataset quality based on the indirect qualities of the repositories and the direct qualities of the repositories, and means for filtering out a subset of the datapoints to adjust the quality.

Example 29 includes the apparatus of example 28, wherein the means for determining quality is to determine the indirect quality based on at least one of metadata corresponding to the repository, and determine the direct quality based on a proportion of (a) a number of repositories that include a datapoint of the dataset to (b) a total number of the repositories.

Example 30 includes the apparatus of example 29, wherein the metadata includes at least one of ages of the repository, a total number of contributors to the repository, a total number of commits, a number of lines of code in the repository, a total number of open issues, a total number of closed issues, presence of a unit test in the code, presence of documentation in the code, a number of full continuous integration and delivery (CI/CD) runs style checks, or a number of CI/CD run unit test.

Example 31 includes the apparatus of example 28, wherein the means for determining quality is to determine qualities of the datapoints based on an average repository quality of repositories that include the datapoints, the average repository quality being based on the indirect quality and the direct quality.

Example 32 includes the apparatus of example 28, wherein the means for determining quality is to determine the dataset quality based on an average datapoint quality of the datapoints included in the dataset.

Example 33 includes the apparatus of example 28, wherein the subset of the datapoints negatively affects the dataset quality.

Example 34 includes the apparatus of example 28, wherein the subset of the datapoints positively affects the dataset quality.

Example 35 includes the apparatus of example 28, wherein the quality is a first quality and the subset is a first subset, wherein the means for determining quality is to determine a second quality of the dataset after the subset has been filtered out, and the means for filtering is to, in response to the second quality not satisfying a threshold, filter out a second subset of the datapoints to adjust the second quality.

Example 36 includes the apparatus of example 28, wherein the means for determining quality is to employ the dataset after the subset has been filtered out to an artificial intelligence-based model to train the artificial intelligence-based model.

Example 37 includes a method to improve data quality, the method comprising determining, by executing an instruction with one or more processors, indirect qualities of repositories that contribute to datapoints of a dataset, determining, by executing an instruction with the one or more processors, direct qualities of the repositories that contribute to the datapoints of the dataset, and determining, by executing an instruction with the one or more processors, a dataset quality based on the indirect qualities of the repositories and the direct qualities of the repositories, and removing, by executing an instruction with the one or more processors, a subset of the datapoints to adjust the quality.

Example 38 includes the method of example 37, further including determining the indirect qualities based on at least one of metadata corresponding to the repositories, and determining the direct qualities based on a proportion of (a) a number of the repositories that contribute to a datapoint of the dataset to (b) a total number of the repositories.

Example 39 includes the method of example 38, wherein the metadata includes at least one of ages of the repositories, a total number of contributors to the repositories, a total number of commits, a number of lines of code in the repositories, a total number of open issues, a total number of closed issues, whether the code includes a unit test, whether the code includes documentation, a number of full continuous integration and delivery (CI/CD) runs style checks, or a number of CI/CD run unit test.

Example 40 includes the method of example 37, wherein the determining of the qualities of the datapoints is based on an average repository quality of the repositories that contribute to the datapoints, the average repository quality being based on at least one of the indirect qualities and the direct qualities.

Example 41 includes the method of example 37, wherein the determining of the dataset quality is based on an average datapoint quality of the datapoints included in the dataset.

Example 42 includes the method of example 37, wherein the subset of the datapoints negatively affect the dataset quality.

Example 43 includes the method of example 37, wherein the quality is a first quality and the subset is a first subset, and further including determining a second dataset quality after the first subset was removed, and when the second quality does not satisfy a threshold, removing a second subset of the datapoints to adjust the second quality.

Example 44 includes the method of example 37, further including providing the dataset to an artificial intelligence-based model to train the artificial intelligence-based model.

From the foregoing, it will be appreciated that example systems, methods, apparatus, and articles of manufacture have been disclosed that improve data quality for artificial intelligence. To generate a robust AI-based model, it may be desirable to use large amount of training data. Accordingly, open-source or crowd sourced data may be used as training data. However, open-sourced and/or crowd-sourced data may include low quality and/or malicious data. In some examples, an attacker may generate a repository with low quality and/or malicious information designed to negatively affect the quality of an AI-based model. In some examples, a person may provide poor quality data corresponding to bugs, errors, and/or another poor quality metric to a repository. Using poor quality data for AI model training may result in a poor quality AI-based model. Examples disclosed herein provide a mechanism for determining the quality of data (e.g., datapoints) in a dataset, quality of the datasets, and/or quality of the repositories. If the quality of the training dataset is below a threshold, examples disclosed herein remove low quality data from the training dataset to improve the training dataset. Accordingly, examples disclosed herein improve training data, which improves the robustness and/or accuracy of AI-based models that are trained based on the improved training data. Disclosed systems, methods, apparatus, and articles of manufacture are accordingly directed to one or more improvement(s) in the operation of a machine such as a computer or other electronic and/or mechanical device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to support training a neural network, the apparatus comprising:
   an interface;
   computer-readable instructions; and
   programmable circuitry to utilize the computer-readable instructions to:
      determine an indirect quality of a repository based on at least one datapoint of a dataset;
      determine a direct quality of the repository based on the at least one datapoint of the dataset;
      determine a dataset quality of the dataset based on the indirect quality of the repository and the direct quality of the repository;
      determine qualities of multiple datapoints from the dataset based on an average repository quality of repositories that include the datapoints, the average repository quality based on indirect qualities and direct qualities of the repositories that include the datapoints;
      update the dataset by filtering out at least one data point in the dataset based on the qualities of the datapoints; and
      train a neural network with the updated dataset.

2. The apparatus of claim 1, wherein the programmable circuitry is to:
   determine the indirect quality based on at least one of metadata corresponding to the repository; and
   determine the direct quality based on a proportion of (a) a number of repositories that include a datapoint of the dataset to (b) a total number of the repositories.

3. The apparatus of claim 2, wherein the metadata includes at least one of ages of the repository, a total number of contributors to the repository, a total number of commits, a number of lines of code in the repository, a total number of open issues, a total number of closed issues, presence of a unit test in the code, presence of documentation in the code, a number of full continuous integration and delivery (CI/CD) runs style checks, or a number of CI/CD run unit test.

4. The apparatus of claim 1, wherein the programmable circuitry is to determine the dataset quality based on an average datapoint quality of the datapoints included in the dataset.

5. The apparatus of claim 1, wherein the at least one datapoint negatively affects the dataset quality.

6. The apparatus of claim 1, wherein the at least one datapoint positively affects the dataset quality.

7. The apparatus of claim 1, wherein the dataset quality is a first dataset quality, the programmable circuitry is to:
   determine a second dataset quality of the updated dataset after the at least one data point has been filtered out; and
   filter out a second datapoint of the datapoints from the updated dataset to adjust the second dataset quality based on the second dataset quality not satisfying a threshold.

8. A non-transitory computer readable medium comprising instructions to cause one or more processors to at least:
   determine an indirect quality of a repository that includes at least one datapoint of a dataset;
   determine a direct quality of the repository that includes the at least one datapoint of the dataset;
   determine a dataset quality of the dataset based on the indirect quality of the repository and the direct quality of the repository;
   determine qualities of multiple datapoints from the dataset based on an average repository quality of repositories that include the datapoints, the average repository quality based on indirect qualities and direct qualities of the repositories that include the datapoints;
   update the dataset by removing at least one data point in the dataset based on the qualities of the datapoints; and
   train an artificial intelligence-based model with the updated dataset.

9. The non-transitory computer readable medium of claim 8, wherein at least one of the one or more processors is to:
   determine the indirect quality based on at least one of metadata corresponding to the repository; and
   determine the direct quality based on a proportion of (a) a number of repositories that include a datapoint of the dataset to (b) a total number of the repositories.

10. The non-transitory computer readable medium of claim 9, wherein the metadata includes at least one of ages of the repository, a total number of contributors to the repository, a total number of commits, a number of lines of code in the repository, a total number of open issues, a total number of closed issues, presence of a unit test in the code, presence of documentation in the code, a number of full continuous integration and delivery (CI/CD) runs style checks, or a number of CI/CD run unit test.

11. The non-transitory computer readable medium of claim 8, wherein at least one of the one or more processors is to determine the dataset quality based on an average datapoint quality of the datapoints included in the dataset.

12. The non-transitory computer readable medium of claim 8, wherein the at least one datapoint negatively affects the dataset quality.

13. The non-transitory computer readable medium of claim 8, wherein the at least one datapoint positively affects the dataset quality.

14. The non-transitory computer readable medium of claim 8, wherein the dataset quality is a first dataset quality, at least one of the one or more processors is to:
   determine a second dataset quality of the updated dataset after the at least one data point has been removed; and
   in response to the second dataset quality not satisfying a threshold, remove a second datapoint to adjust the second dataset quality.

15. An apparatus to improve a dataset to train a neural network, the apparatus comprising:
   interface circuitry; and
   programmable circuitry including one or more of:
      at least one of a central processing unit, a graphic processing unit or a digital signal processor, the at least one of the central processing unit, the graphic processing unit or the digital signal processor having control circuitry, one or more registers, and arithmetic and logic circuitry to perform one or more first operations corresponding to instructions in the apparatus, and;
      a Field Programmable Gate Array (FPGA), the FPGA including logic gate circuitry, a plurality of configurable interconnections, and storage circuitry, the logic gate circuitry and interconnections to perform one or more second operations; or
      Application Specific Integrate Circuitry (ASIC) including logic gate circuitry to perform one or more third operations;
      the programmable circuitry to perform at least one of the first operations, the second operations or the third operations to instantiate:
         data quality determination circuitry to:
            determine an indirect quality of a repository including at least one datapoint of a dataset;
            determine a direct quality of the repository;
            determine a dataset quality of the dataset based on the indirect quality of the repository and the direct quality of the repository; and
            determine qualities of multiple datapoints from the dataset based on an average repository quality of repositories that include the datapoints, the average repository quality based on indirect qualities and direct qualities of the repositories that include the datapoints; and
         a filter to update the dataset by filtering out at least one data point in the dataset based on the qualities of the datapoints; and
         a neural network to train using the updated dataset.

16. The apparatus of claim 15, wherein the data quality determination circuitry is to:
   determine the indirect quality based on at least one of metadata corresponding to the repository; and
   determine the direct quality based on a proportion of (a) a number of repositories that include a datapoint of the dataset to (b) a total number of the repositories.

17. The apparatus of claim 16, wherein the metadata includes at least one of ages of the repository, a total number of contributors to the repository, a total number of commits, a number of lines of code in the repository, a total number of open issues, a total number of closed issues, presence of a unit test in the code, presence of documentation in the code, a number of full continuous integration and delivery (CI/CD) runs style checks, or a number of CI/CD run unit test.

18. The apparatus of claim 15, wherein the data quality determination circuitry is to determine the dataset quality of the dataset based on an average datapoint quality of the datapoints included in the dataset.

19. The apparatus of claim 15, wherein the dataset quality is a first dataset quality, wherein:
   the data quality determination circuitry is to determine a second dataset quality of the dataset after the at least one data point has been filtered out; and
   the filter is to, in response to the second dataset quality not satisfying a threshold, filter out a second datapoint to adjust the second dataset quality.

20. The apparatus of claim 15, wherein the at least one datapoint negatively affects the dataset quality.

21. The apparatus of claim 15, wherein the at least one datapoint positively affects the dataset quality.

22. The apparatus of claim 15, wherein the at least one datapoint negatively affects the dataset quality.

23. The apparatus of claim 15, wherein the at least one datapoint positively affects the dataset quality.

* * * * *